Oct. 10, 1950     CARL-ERIK GRANQVIST     2,524,905
FORWARD AND REVERSE FRICTION GEAR TRANSMISSION
Filed Jan. 22, 1946
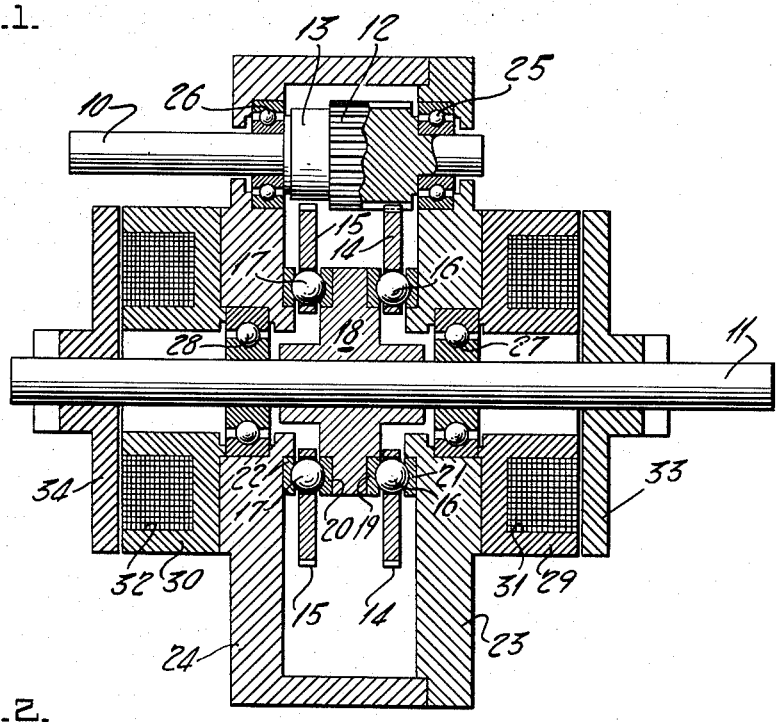
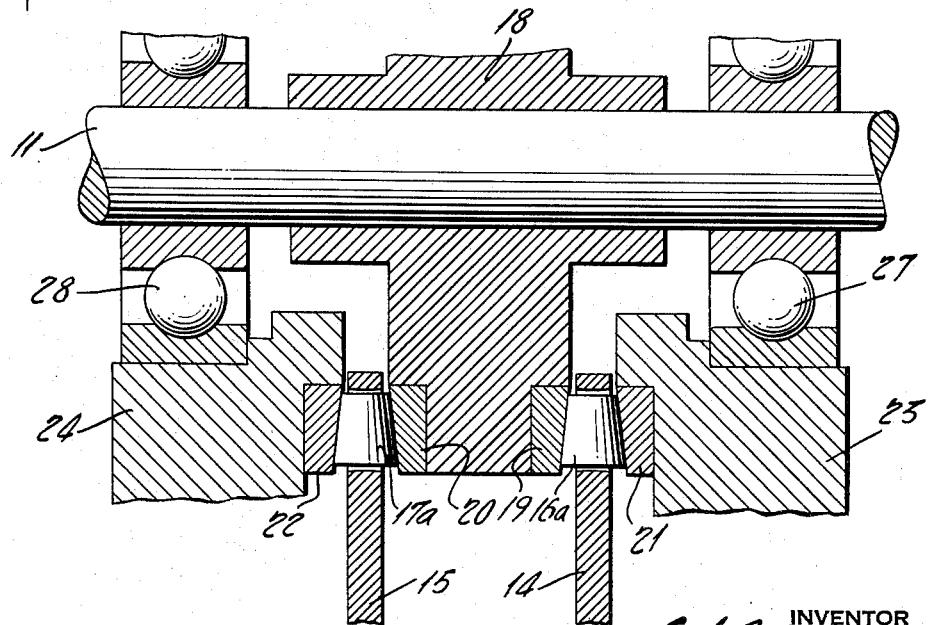
INVENTOR
Carl-Erik Granqvist
BY
ATTORNEY Patented Oct. 10, 1950

2,524,905

UNITED STATES PATENT OFFICE 2,524,905

FORWARD AND REVERSE FRICTION GEAR TRANSMISSION

Carl-Erik Granqvist, Lidingö, Sweden, assignor to Svenska Aktiebolaget Gasaccumulator, Lidingö, Sweden, a corporation of Sweden Application January 22, 1946, Serial No. 642,701
In Sweden January 25, 1945

10 Claims. (Cl. 74—750)

The present invention refers to an engageable and disengageable friction gearing, primarily intended to be employed as a servo-motor in remote control systems but applicable also to all kinds of other different purposes.

When a friction gearing is to be used as a servo-motor in a remote control system, the object is to transfer motion from a usually continuously rotating shaft to the shaft to be adjusted. The accuracy of the remote control depends upon the rapidity with which the servo-motor operates, and when friction couplings or friction gearings have been employed between a continuously rotating shaft and the shaft to be adjusted, the object has primarily been to obtain a very rapid adjustment. If one shaft rotates continuously with its full number of revolutions and if the adjusted shaft and the parts connected with it have a sufficiently small mass, a very swift motion and particularly a very swift acceleration of the motion could be effected. In practice, however, it has proved impossible fully to attain the advantages aimed at for the reason that the closing time of the friction coupling has been too long.

The present invention refers to a friction gearing which is intended to connect a preferably continuously rotating, driving shaft with a shaft intermittently driven in one direction or the other and which is provided with balls or rollers disposed between races as motion transferring elements and in which an extremely short closing time is attained.

The manner in which this is attained may best be understood by reference to the ensuing portion of this specification and by the accompanying drawings forming a part hereof which disclose by way of example but without limitation suitable forms of apparatus for carrying the invention into effect.

In the drawings:

Fig. 1 is a more or less diagrammatic sectional view of a mechanism embodying the principles of the invention; and Fig. 2 is a fragmentary section on larger scale showing another form of motion transmitting element incorporated in the organization shown in Fig. 1.

Referring now to Fig. 1, 10 denotes a continuously rotating shaft, while 11 denotes a shaft which is to be adjusted. On the shaft 10 there is mounted a pinion 12, which, however, is made in such a manner that the teeth in the longitudinal space 13 have been milled off. The pinion 12 meshes with a second pinion, which does not appear in the drawing, since it lies behind the pinion 12. The second pinion is made in such a way that the teeth are milled off at a portion corresponding to the portion 13 which, however, is situated to the right in the figure. The pinion 12 and the second pinion will consequently rotate in opposite directions. The pinion 12 meshes with a disc 14, while the second pinion correspondingly meshes with a disc 15. As the shaft 10 rotates, the discs 14 and 15 will thus rotate with equal velocity in opposite directions. These discs are mounted to turn freely on the driven shaft 11.

In the most uncomplicated embodiment of the invention a number of holes are bored through each of the discs 14 and 15 and in each such hole there is disposed a ball 16 and 17 respectively. The discs 14 and 15 may be considered as retainers for the balls 16 and 17 in an axial thrust ball bearing. For very large couplings one even could put in complete ball bearings instead of each one of the separate balls 16 and 17. Between the discs 14 and 15 there is disposed a bearing disc 18 keyed to the shaft 11. Preferably the bearing disc is provided with two races 19 and 20 in contact with the balls 16 and 17 respectively. A couple of corresponding races 21 and 22 are mounted in a fixed part of the device, which part in this instance consists of the two casing halves 23 and 24 conveniently joined by bolts. In these halves are also mounted the ball bearings 25 and 26 for the shaft 10 and 27 and 28 for the shaft 11. To each casing half 23 and 24 there is in addition attached a torus-shaped magnetic core, shown at 29 and 30 respectively. In the torus-shaped opening 31 of the magnetic core 29 and in the torus-shaped opening 32 of the magnetic core 30 the windings of these electro-magnets are disposed. The magnets 29 and 30 cooperate with the disc-shaped armatures 33 and 34, which are keyed to the shaft 11.

The gearing according to the invention functions in the following manner: It is assumed that in the customary manner there is a very small clearance for axial motion in the two radial ball bearings 27 and 28. The shaft 11 is thus able to move axially a trifling distance, in the order of magnitude of some tenth of a millimeter or possibly even less.

The discs 14 and 15 rotate in opposite directions in the manner described above, when the continuously rotating shaft 10 is kept moving. In this way the balls 16 and 17 will thus rotate between the two races 19, 21 and 20, 22 respectively. There is reason to presume that between the balls and their respective races an oil film develops and in practice it has also turned out that in spite of the rotation of the discs 14 and 15 the disc 18 is not moved and that the friction between the moving discs 14 and 15 and the stationary disc 18 is extremely small.

When the shaft 11 is to be put in motion in one direction, current is supplied to the magnetic winding in the groove 31 so that the magnet becomes operative. It will then attract the armature 33 towards its poles and the shaft 11 will be displaced a very short distance, which, nevertheless, is sufficient for breaking the oil films between the balls 17 and the races 20 and 22 so that the balls will make metallic contact with the races 20 and 22. Now the friction between the balls 17 and the races 20, 22 increases abruptly and the disc 18 will consequently be rotated with a high rate of acceleration in the direction of rotation of the disc 15. The shaft 11 is therefore put in motion practically immediately. If current had been fed to the winding in the groove 32 instead, so that the magnet 30 had attracted its armature 34, a corresponding contact would have been produced between the balls 16 and the races 19 and 21 and the shaft 11 would have been rotated in the opposite direction.

Although the device according to the invention has been described above on the basis of the hypothetical assumption that an oil film is developed between the balls and their respective races, practical test has shown that in any case the device has the effect which has been stated above even if the theory for explaining this effect might not be quite correct. The invention is therefore not dependent on said theory, but refers to the structure of the gearing device. This can be modified within the scope of the inventive idea and in so doing the different elements contained therein may have another shape or function than what has been stated above with reference to the embodiment just described.

As previously noted rollers may be used instead of balls and in Fig 2 such an arrangement is shown, in which rollers 16a and 17a are employed. As shown, these rollers should be conical so that the proper angular velocity is maintained at every point of the surface of the rollers. This is accomplished by making the taper of the rollers such that the apex of the conical envelope lies at the axis of rotation of shaft 11.

In the embodiments described the discs are shown as normal to the axis of rotation but they may be of different form to provide motion transmitting contact between conical surfaces, between which higher contact pressure may be obtained by application of a given engaging force, with correspondingly longer engaging movement and time. Also, while in the examples shown the balls or rollers are rotated and engage a stationary race, the reverse of this arrangement will give an equivalent result. Obviously, so far as the functioning of the device is concerned, the shaft 11 may be the driving shaft and shaft 10 the driven.

It will therefore be understood that the invention is not restricted to the examples hereinbefore described but includes all forms of appartaus falling within the scope of the appended claims.

What is claimed is:

1. A releasable friction gearing for transmitting motion between a uni-directional first shaft and a reversible second shaft comprising a first motion transmitting mechanism for connecting said shafts to cause them to rotate in the same direction, a second motion transmitting mechanism for connecting said shafts to cause them to rotate in opposite directions, each of said mechanisms including a releasable force transmitting device having confronting race elements mounted for relative rotation with respect to each other and a plurality of rolling force transmitting elements disposed between said race elements certain of said race elements being connected to said second shaft, and means for selectively exerting compressive pressure on the rolling elements of one or the other of said devices to constrain the force transmitting elements of the device to simultaneously engage both of the races of the device in rolling contact and impart to the same a relative rotational movement resulting from said rolling contact.

2. A gearing as set forth in claim 1, in which the compressive pressure for producing the rolling action of one or the other of said devices is provided by means for moving one of said shafts axially in one or another of two opposite directions.

3. A gearing as set forth in claim 1, in which one of the elements of each of said force transmitting devices is connected to one of said shafts, the connections being such that the directions of motion between the said one of said shafts and one of the connected elements are the same while the directions of motion between the said one of said shafts and the other element connected to it are opposite.

4. A gearing as set forth in claim 3, in which the elements connected to the said one of said shafts consist of carriers for the rolling force transmitting elements contacting said race elements.

5. A gearing as set forth in claim 1, including a rotationally stationary casing structure to which one of the race elements of each of said device is connected, and disc elements by which the rolling elements of each of said devices are carried operatively connected to rotate with one of said shafts and the remaining race elements of each of said devices are connected to the other of said shafts.

6. A gearing as set forth in claim 5, in which including means for moving one of said shafts axially to exert compressive force on the rolling elements of one or the other of said devices.

7. A gearing as set forth in claim 1, in which the means for selectively exerting engaging pressure on said devices consists of an axially movable member arranged to move the confronting races of said devices toward or away from each other, and electromagnetic means for moving said member in selected direction.

8. A gearing as set forth in claim 7, in which the axially movable member comprises one of said shafts, radial ball bearings rotatably mounting said shaft, said bearings having sufficient play to permit limited axial movement of the shaft.

9. A gearing as set forth in claim 1, in which the elements in rolling contact with the races are balls.

10. A gearing as set forth in claim 1, in which the elements in rolling contact with the races are rollers.

CARL-ERIK GRANQVIST.

(References on following page)

REFERENCES CITED

The following references are of record in the file of this patent:

UNITED STATES PATENTS

| Number | Name | Date |
|---|---|---|
| 272,988 | Thompson | Feb. 27, 1883 |
| 745,814 | Gibbs | Dec. 1, 1903 |
| 1,768,859 | Petrelli | July 1, 1930 |
| 2,081,824 | Lambert | May 25, 1937 |
| 2,113,456 | Stephenson | Apr. 5, 1938 |
| 2,138,129 | Wolfram | Nov. 29, 1938 |
| 2,253,535 | Weinig | Aug. 26, 1941 |

FOREIGN PATENTS

| Number | Country | Date |
|---|---|---|
| 20,897 | France | July 23, 1919 |
| 204,512 | Great Britain | Nov. 16, 1923 |
| 769,261 | France | Apr. 23, 1934 |

Certificate of Correction

Patent No. 2,524,905                                                  October 10, 1950

CARL-ERIK GRANQVIST

It is hereby certified that error appears in the printed specification of the above numbered patent requiring correction as follows:

Column 6, list of references cited, under the heading "UNITED STATES PATENTS" add the following:

*2,086,498*      *Geldhof* _____ *July 6, 1937* and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*